United States Patent [19]
Diamond

[11] 3,868,462
[45] Feb. 25, 1975

[54] THIOPSEUDOURONIUM COMPOUNDS FOR TREATING GASTROINTESTINAL HYPERACIDITY AND ULCERATION

[75] Inventor: Julius Diamond, Lafayette Hill, Pa.

[73] Assignee: William H. Rorer, Inc., Fort Washington, Pa.

[22] Filed: Dec. 22, 1972

[21] Appl. No.: 317,575

Related U.S. Application Data

[62] Division of Ser. No. 142,038, May 10, 1971.

[52] U.S. Cl.............. 424/326, 424/248, 424/250, 424/263, 424/266, 424/267, 424/275, 424/300, 424/302, 424/304, 424/308, 424/311, 424/316, 424/317

[51] Int. Cl............................................ A61k 27/00

[58] Field of Search..................................... 424/326

[56] References Cited
UNITED STATES PATENTS
3,513,197  5/1970  Daum et al..................... 424/326 X

*Primary Examiner*—Frederick E. Waddell
*Attorney, Agent, or Firm*—James A. Nicholson

[57] ABSTRACT

The thiopseudouronium compounds of this invention possess useful gastric anti-secretory, spasmolytic and anti-ulcerogenic properties. A method of treating gastrointestinal hyperacidity and ulceration has also been disclosed.

2 Claims, No Drawings

THIOPSEUDOURONIUM COMPOUNDS FOR TREATING GASTROINTESTINAL HYPERACIDITY AND ULCERATION

CROSS REFERENCE TO RELATED APPLICATIONS

This is a division of application Ser. No. 142,038, filed May 10, 1971.

SUMMARY OF THE INVENTION

This invention describes new thiopseudouronium compounds and processes for their preparation. This invention further provides valuable pharmaceutical preparations which contain these thiopseudouronium compounds as gastric anti-secretory, spasmolytic and anti-ulcerogenic agents. A method for the treatment of gastrointestinal hyperacidity and ulceration is also described. The compounds of this invention also display pharmacological effects in the cardiovascular and central nervous systems.

BACKGROUND OF THE INVENTION

The pharmaceutical compositions which have been used as anti-secretory and spasmolytic agents have been such as atropine, homatropine, propantheline bromide, dicyclomine hydrochloride and other compounds which are structurally dissimilar to the thiopseudouronium compounds of this invention. Due to the anti-cholinergic properties of these known compounds, they produce undesirable side effects such as mydriasis, xerostomia, cyclopegia and other unwanted effects.

I have unexpectedly found that N-substituted-2-aralkyl-2-thiopseudouronium compounds have valuable pharmacologic properties.

I have found that N-substituted-2-aralkyl-2-thiopseudouronium salts possess useful gastric anti-secretory, spasmolytic and anti-ulcerogenic properties.

I have further found novel N-substituted-2-aralkyl-2-thiopseudouronium salts.

I have also found that the compounds of this invention are substantially void of the anti-cholinergic side effects which accompany known gastric anti-secretory and spasmolytic agents.

I have still further found a simple and effective method for treating gastrointestinal hyperacidity and ulceration such as duodenal and peptic ulcers.

I have found a class of therapeutically effective compounds which possesses an effective degree of antihypertensive and CNS depressant activity.

DESCRIPTION AND PREFERRED EMBODIMENTS

This invention describes a class of novel chemical compounds which contain an aralkyl or substituted aralkyl radical attached to an N-substituted-2-thiopseudouronium moiety. This invention describes their non-toxic pharmaceutically acceptable salts and the method of preparing the instant compounds.

This invention also describes a new method of treating gastrointestinal disorders and diseases of the gastrointestinal tract and for use in gastrointestinal therapeutic compositions, which comprise the administration of a 2-thiopseudouronium compound having the structural formula I:

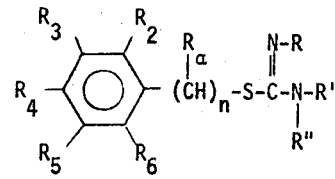

I where:
$n$ is 1–2;
$R_\alpha$ is hydrogen,
  loweralkyl,
  loweralkenyl,
  cycloloweralkyl,
  cycloloweralkenyl,
  aryl (preferably phenyl, tolyl, xylyl, etc.),
  arloweralkyl (preferably benzyl, etc.), or
  heterocyclic (preferably pyridyl, etc.);
$R_2$, $R_3$, $R_4$, $R_5$ and $R_6$ may be the same or different and are
  hydrogen,
  loweralkyl,
  halo,
  haloloweralkyl,
  nitro,
  amino,
  mono- and diloweralkylamino,
  acylamino,
  cyano,
  carbamyl,
  carboxy,
  carbloweralkoxy,
  loweralkoxy,
  haloloweralkoxy,
  hydroxy,
  acyl,
  haloacyl,
  acyloxy,
  phenoxy,
  halophenoxy,
  phenyl,
  halophenyl,
  thiocyanato,
  mercapto,
  loweralkylthio,
  loweralkylsulfinyl,
  loweralkylsulfonyl,
  haloloweralkylsulfonyl,
  sulfo,
  sulfonamido,
  sulfinamido,
  diloweralkylsulfonamido or
  halodiloweralkylsulfonamido;
R, R′ and R″ may be the same or different and are
  hydrogen (provided R, R′ and R″ are not all hydrogen at the same time),
  aryl,
  heteryl or
  a 1–15 carbon atom member which may be straight chained or branched and is
  alkyl,
  aklenyl,
  alkynyl,
  cycloalkyl,
  cycloalkenyl,
  cycloalkylloweralkyl,
  cycloalkenylloweralkyl,
  spiroalkyl or
  bicycloalkyl;

R' and R" together may also be an alkylidenyl chain having 4–15 carbon atoms; and;

HX is an organic or inorganic acid capable of forming a pharmaceutically acceptable non-toxic acid addition salt (preferably
hydrochloric acid,
hydrobromic acid,
hydroiodic acid,
sulfuric acid,
sulfurous acid,
nitric acid,
nitrous acid,
phosphoric acid,
phosphorous acid,
acetic acid,
propionic acid,
malic acid,
maleic acid,
succinic acid,
citric acid,
tartanic acid,
ascorbic acid,
benzoic acid,
mandelic acid,
lactic acid,
nicotinic acid,
benzenesulfonic acid,
methanesulfonic acid,
ethanesulfonic acid,
benzenesulfonic acid,
toluenesulfonic acid,
glycine,
alanine,
glutamic acid,
phthalic acid,
stearic acid,
oleic acid, and
abietic acid); and
the free bases thereof.

The more preferred compounds which are useful in the treatment of anti-secretory, anti-spasmodic and anti-ulcerogenic diseases or disorders of gastrointestinal tract and for use in gastrointestinal therapeutic compositions embrace those compounds of structural formula II.

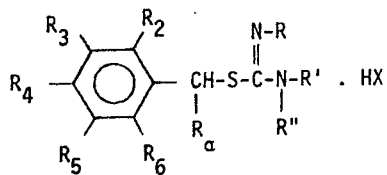

II where:
R$_\alpha$ is hydrogen or loweralkyl;
R$_2$, R$_3$, R$_4$, R$_5$ and R$_6$ may be the same or different and are
hydrogen,
halo,
haloloweralkyl,
nitro,
cyano,
haloloweralkoxy,
haloloweracyl,
haloloweralkylsulfonyl or
halodiloweralkylsulfonamido;
R, R' and R" may be the same or different and are
hydrogen (provided R, R' and R" are not all hydrogen at the same time), or
a 1–15 carbon atom member which may be straight chained or branched and is
alkyl,
alkenyl,
cycloalkenyl; and
HX is hydrochloric acid,
hydrobromic acid,
hydroiodic acid,
sulfonic acid or
acetic acid.

The most preferred compounds for the treatment of gastrointestinal disorders and for use in gastrointestinal therapeutic compositions are described by structural formula II. where:
R$_\alpha$ is hydrogen or methyl;
R$_2$, R$_3$, R$_4$, R$_5$ and R$_6$ are
hydrogen,
fluoro,
chloro,
bromo,
iodo,
trifluoromethyl or
nitro;
R, R' and R" may be the same or different and are
hydrogen (provided R, R' and R" are not all hydrogen at the same time), or
a 1–15 carbon atom member which may be straight chained or branched and is
alkyl,
alkenyl,
cycloalkyl or
cycloalkenyl; and
HX is hydrochloric acid or
hydrobromic acid.

In the descriptive portions of this invention, the following definitions apply: The term "lower alkyl" refers to a lower alkyl hydrocarbon group containing from 1 to about 8 carbon atoms which may be straight chained or branched.

The "lower alkenyl" group refers to a lower alkenyl hydrocarbon group containing from 2 to about 8 carbon atoms which may be straight chained or branched.

The "acyl" radical may be any organic radical derived from an organic acid by the removal of its hydroxyl group, such as acetyl, propionyl, benzoyl, etc.

The "lower alkoxy" radical signifies an alkoxy group containing from 1 to about 8 carbon atoms which can be straight chained or branched.

The preferred "aryl" is phenyl or substituted phenyl where the substituent is loweralkyl.

"Heteryl" refers to a heterocyclic ring which may be saturated or unsaturated and having one or more hetero atoms selected from O, N or S such as pyridyl, piperdinyl, morpholinyl, thienyl, piperazinyl, etc.

This invention further describes new chemical compounds which are generically described by the structural formula as shown in FIG. I: where:
$n$ is 1–2;
R$_\alpha$ is hydrogen,
loweralkyl,
loweralkenyl,
cycloloweralkyl,
cycloloweralkenyl, aryl (preferably phenyl, tolyl, xylyl, etc.),
arloweralkyl (preferably benzyl, etc.),
heteryl (preferably pyridyl, etc.):

$R_2$, $R_3$, $R_4$, $R_5$ and $R_6$ may be the same or different and are
  hydrogen (provided $R_2$, $R_3$, $R_4$, $R_5$ and $R_6$ are not all hydrogen at the same time),
  mono- and dialkylamino,
  acylamino,
  carbamyl,
  carboxy,
  carbloweralkoxy,
  haloloweralkoxy,
  acyl,
  haloacyl,
  acyloxy,
  phenoxy,
  halophenoxy,
  halophenyl,
  thiocyanato,
  mercapto,
  loweralkylthio,
  loweralkylsulfinyl,
  loweralkylsulfonyl,
  haloloweralkylsulfonyl,
  sulfo,
  sulfonamido,
  diloweralkylsulfonamido or
  halodiloweralkylsulfonamido;

$R_2$, $R_3$, $R_4$, $R_5$ and $R_6$ may also be
  fluoro,
  bromo,
  iodo,
  nitro,
  loweralkoxy,
  haloloweralkyl or
  cyano provided when $n$ is 1 that at least one of $R_\alpha$, $R_2$, $R_3$, $R_4$, $R_5$ and $R_6$ are other than hydrogen, or
  chloro provided when $n$ is 1 that fewer than three hydrogen atoms are present in the ring or $R_\alpha$ is other than hydrogen when chloro is the only substituent;

R, R' and R'' may be the same or different and are
  hydrogen (provided R, R' and R'' are not all hydrogen at the same time),
  aryl,
  heteryl or
  a 1–15 carbon atom member which may be staight chained or branched and is
    alkyl,
    alkenyl,
    alkynyl,
    cycloalkyl,
    cycloalkenyl,
    cycloalkylloweralkyl,
    cycloalkenylloweralkyl,
    spiroalkyl or
    bicycloalkyl;

R' and R'' together may also be an alkylidenyl chain 4–15 carbon atoms; and

HX is an organic or inorganic acid capable of forming a pharmaceutically acceptable non-toxic acid addition salt (preferably
  hydrochloric acid,
  hydrobromic acid,
  hydroiodic acid,
  sulfuric acid,
  sulfurous acid,
  nitric acid,
  nitrous acid,
  phosphoric acid,
  phosphorous acid,
  acetic acid,
  propionic acid,
  malic acid,
  maleic acid,
  succinic acid,
  citric acid,
  tartanic acid,
  ascorbic acid,
  benzoic acid,
  mandelic acid,
  lactic acid,
  nicotinic acid,
  benzenesulfonic acid,
  methanesulfonic acid,
  ethanesulfonic acid,
  benzenesulfonic acid,
  toluenesulfonic acid,
  glycine,
  alanine,
  glutamic acid,
  phthalic acid,
  stearic acid,
  oleic acid or
  abietic acid); and
the free bases thereof.

The more preferred compounds of this invention are those described by formula II:
where:
  $R_\alpha$ is hydrogen,
    loweralkyl,
    aryl,
    arloweralkyl or
    heteryl;

$R_2$, $R_3$, $R_4$, $R_5$ and $R_6$ may be the same or different and are
  hydrogen (provided $R_2$, $R_3$, $R_4$, $R_5$ and $R_6$ are not all hydrogen at the same time),
  haloloweralkoxy,
  haloloweracyl,
  haloloweralkylsulfonyl,
  halodiloweralkylsulfonamido;

$R_2$, $R_3$, $R_4$, $R_5$ and $R_6$ may also be
  fluoro,
  bromo,
  nitro,
  cyano or
  haloloweralkyl provided at least one of $R_\alpha$, $R_2$, $R_3$, $R_4$, $R_5$ and $R_6$ are other than hydrogen;

$R_2$, $R_3$, $R_4$, $R_5$ and $R_6$ may also be
  chloro provided fewer than three hydrogen atoms are present in the ring or $R_\alpha$ is other than hydrogen when chloro is the only substituent;

R, R' and R'' may be the same or different and are
  hydrogen (provided R, R' and R'' are not all hydrogen at the same time), or
  a 1–15 carbon atom member which may be straight chained or branched and is
    alkyl,
    alkenyl,
    cycloalkyl or
    cycloalkenyl; and HX is hydrochloric acid,
hydrobromic acid or
hydroiodic acid.

The most preferred compounds of this invention are described by structural formula II:
where:
$R_\alpha$ is hydrogen,
methyl
benzyl or
phenyl:
$R_2, R_3, R_4, R_5$ and $R_6$ are
hydrogen (provided $R_2, R_3, R_4, R_5$ and $R_6$ are not all hydrogen at the same time),
fluoro,
bromo,
iodo,
trifluoromethyl or
nitro provided at least one of $R_\alpha, R_2, R_3, R_4, R_5$ and $R_6$ are other than hydrogen;
$R_2, R_3, R_4, R_5$ and $R_6$ may also be
chloro provided fewer than three hydrogen atoms are present in the ring or $R_\alpha$ is other than hydrogen when chloro is the only substituent; and
R, R' and R'' may be the same or different and are hydrogen (provided R, R' and R'' are not all hydrogen at the same time), or
a 1–15 carbon atom member which may be straight chained or branched and is
alkyl,
alkenyl,
cycloalkyl or
cycloalkenyl; and
HX is hydrochloric acid or
hydrobromic acid.

The free base of the above compounds can be prepared by any conventional method and also be within the scope of this invention.

The compounds of this invention can contain asymmetric carbon atoms when $n$ is 1 or 2 and $R_\alpha$ is other than hydrogen. For this reason, they may be obtained as racemic mixtures or as dextro (+) and levorotatory (−) isomers. These may be separated by any of the various methods of resolution to obtain the $d$ or $l$ compound. It is understood that these optical isomers are embraced within the scope of this invention.

Representative compounds of this invention which are particularly useful are as follows:
1-methyl-2-(2,6-dichlorobenzyl)-2-thiopseudouronium chloride
1-ethyl-2-(2,6-dichlorobenzyl)-2-thiopseudouronium chloride
1-propyl-2-(2,6-dichlorobenzyl)-2-thiopseudouronium chloride
1-i-propyl-2-(2,6-dichlorobenzyl)-2-thiopseudouronium chloride
1-butyl-2-(2,6-dichlorobenzyl)-2-thiopseudouronium chloride
1-i-butyl-2-(2,6-dichlorobenzyl)-2-thiopseudouronium chloride
1-sec-butyl-2-(2,6-dichlorobenzyl)-2-thiopseudouronium chloride
1-t-butyl-2-(2,6-dichlorobenzyl)-2-thiopseudouronium chloride
1-pentyl-2-(2,6-dichlorobenzyl)-2-thiopseudouronium chloride
1-hexyl-2-(2,6-dichlorobenzyl)-2-thiopseudouronium chloride
1-heptyl-2-(2,6-dichlorobenzyl)-2-thiopseudouronium chloride
1-octyl-2-(2,6-dichlorobenzyl)-2-thiopseudouronium chloride
1-nonyl-2-(2,6-dichlorobenzyl)-2-thiopseudouronium chloride
1-decyl-2-(2,6-dichlorobenzyl)-2-thiopseudouronium chloride
1-undecyl-2-(2,6-dichlorobenzyl)-2-thiopseudouronium chloride
1-dodecyl-2-(2,6-dichlorobenzyl)-2-thiopseudouronium chloride
1-tridecyl-2-(2,6-dichlorobenzyl)-2-thiopseudouronium chloride
1-tetradecyl-2-(2,6-dichlorobenzyl)-2-thiopseudouronium chloride
1-pentadecyl-2-(2,6-dichlorobenzyl)-2-thiopseudouronium chloride
1-allyl-2-(2,6-dichlorobenzyl)-2-thiopseudouronium chloride
1-methallyl-2-(2,6-dichlorobenzyl)-2-thiopseudouronium chloride
1-propargyl-2-(2,6-dichlorobenzyl)-2-thiopseudouronium chloride
1-cyclopropyl-2-(2,6-dichlorobenzyl)-2-thiopseudouronium chloride
1-cyclobutyl-2-(2,6-dichlorobenzyl)-2-thiopseudouronium chloride
1-cyclopentyl-2-(2,6-dichlorobenzyl)-2-thiopseudouronium chloride
1-cyclohexyl-2-(2,6-dichlorobenzyl)-2-thiopseudouronium chloride
1-cycloheptyl-2-(2,6-dichlorobenzyl)-2-thiopseudouronium chloride
1-(cyclopropylmethyl)-2-(2,6-dichlorobenzyl)-2-thiopseudouronium chloride
1-(2-cyclohexenyl-2-(2,6-dichlorobenzyl)-2-thiopseudouronium chloride
1-(2-bicyclo[3.2.1]octyl)-2-(2,6-dichlorobenzyl)-2-thiopseudouronium chloride
1-(2,4-cyclopentadienyl)-2-(2,6-dichlorobenzyl)-2-thiopseudouronium chloride
1-(2-spiro[3.4]octyl)-2-(2,6-dichlorobenzyl)-2-thiopseudouronium chloride
1-propynyl-2-(2,6-dichlorobenzyl)-2-thiopseudouronium chloride
1-(methyl-3-penten-1-yl)-2-(2,6-dichlorobenzyl)-2-thiopseudouronium chloride
1,3-dimethyl-2-(2,6-dichlorobenzyl)-2-thiopseudouronium chloride
1,3-diethyl-2-(2,6-dichlorobenzyl)-2-thiopseudouronium chloride
1,3-dipropyl-2-(2,6-dichlorobenzyl)-2-thiopseudouronium chloride
1,3-di-i-propyl-2-(2,6-dichlorobenzyl)-2-thiopseudouronium chloride
1,3-dibutyl-2-(2,6-dichlorobenzyl)-2-thiopseudouronium chloride
1,3-di-t-butyl-2-(2,6-dichlorobenzyl)-2-thiopseudouronium chloride
1,3-dipentyl-2-(2,6-dichlorobenzyl)-2-thiopseudouronium chloride
1,3-dihexyl-2-(2,6-dichlorobenzyl)-2-thiopseudouronium chloride
1,3-diheptyl-2-(2,6-dichlorobenzyl)-2-thiopseudouronium chloride 1,3-dicyclopropyl-2-(2,6-dichlorobenzyl)-2-thiopseudouronium chloride
1,3-dicyclohexyl-2-(2,6-dichlorobenzyl)-2-thiopseudouronium chloride
1,3-diallyl-2-(2,6-dichlorobenzyl)-2-thiopseudouronium chloride
1,3-dicyclohexylmethyl-2-(2,6-dichlorobenzyl)-2-thiopseudouronium chloride
1,1-dimethyl-2-(2,6-dichlorobenzyl)-2-thiopseudouronium chloride
1,1-dihexyl-2-(2,6-dichlorobenzyl)-2-thiopseudouronium chloride
1,1-dicyclopropyl-2-(2,6-dichlorobenzyl)-2-thiopseudouronium chloride
1,1-dicyclohexyl-2-(2,6-dichlorobenzyl)-2-thiopseudouronium chloride
1,3-dimethyl-1-cyclohexyl-2-(2,6-dichlorobenzyl)-2-thiopseudouronium chloride
1,3-dihexyl-1-cyclohexyl-2-(2,6-dichlorobenzyl)-2-thiopseudouronium chloride
1-cyclohexyl-1-methyl-3-hexyl-2-(2,6-dichlorobenzyl)-2-thiopseudouronium chloride
1,3-dicyclohexyl-1-methyl-2-(2,6-dichlorobenzyl)-2-thiopseudouronium chloride
1,1,3-tricyclohexyl-2-(2,6-dichlorobenzyl)-2-thiopseudouronium chloride
1,1,3-trimethyl-2-(2,6-dichlorobenzyl)-2-thiopseudouronium chloride
1,3-dicyclohexyl-2-(o-chlorobenzyl)-2-thiopseudouronium chloride
1,3-dicyclohexyl-2-(m-chlorobenzyl)-2-thiopseudouronium chloride
1,3-dicyclohexyl-2-(p-chlorobenzyl)-2-thiopseudouronium chloride
1,3-dicyclohexyl-2-(2,3-dichlorobenzyl)-2-thiopseudouronium chloride
1,3-dicyclohexyl-2-(2,4-dichlorobenzyl)-2-thiopseudouronium chloride
1,3-dicyclohexyl-2-(2,5-dichlorobenzyl)-2-thiopseudouronium chloride
1,3-dicyclohexyl-2-(3,4-dichlorobenzyl)-2-thiopseudouronium chloride
1,3-dicyclohexyl-2-(3,5-dichlorobenzyl)-2-thiopseudouronium chloride
1,3-dicyclohexyl-2-(2,3,4-dichlorobenzyl)-2-thiopseudouronium chloride
1,3-dicyclohexyl-2-(2,3,5-dichlorobenzyl)-2-thiopseudouronium chloride
1,3-dicyclohexyl-2-(2,3,6-dichlorobenzyl)-2-thiopseudouronium chloride
1,3-dicyclohexyl-2-(2,4,5-dichlorobenzyl)-2-thiopseudouronium chloride
1,3-dicyclohexyl-2-(2,4,6-dichlorobenzyl)-2-thiopseudouronium chloride
1,3-dicyclohexyl-2-(3,4,5-dichlorobenzyl)-2-thiopseudouronium chloride
1,3-dicyclohexyl-2-(p-trifluoromethylbenzyl)-2-thiopseudouronium chloride
1,3-dicyclohexyl-2-(p-trifluoromethoxybenzyl)-2-thiopseudouronium chloride
1,3-dicyclohexyl-2-(p-trifluoroacetylbenzyl)-2-thiopseudouronium chloride
1,3-dicyclohexyl-2-(p-cyanobenzyl)-2-thiopseudouronium chloride
1,3-dicyclohexyl-2-[p-(4-chlorophenoxy)benzyl]-2-thiopseudouronium chloride
1,3-dicyclohexyl-2-(p-thiacyanatobenzyl)-2-thiopseudouronium chloride
1,3-dicyclohexyl-2-(p-dimethylsulfonamidobenzyl)-2-thiopseudouronium chloride
1,3-dicyclohexyl-2-(o-bromobenzyl)-2-thiopseudouronium bromide
1,3-dicyclohexyl-2-(m-bromobenzyl)-2-thiopseudouronium bromide
1,3-dicyclohexyl-2-(p-bromobenzyl)-2-thiopseudouronium bromide
1,3-dicyclohexyl-2-(p-fluorobenzyl)-2-thiopseudouronium chloride
1,3-dicyclohexyl-2-(2,5-dinitrobenzyl)-2-thiopseudouronium chloride
1,3-dicyclohexyl-2-(2,4-difluorobenzyl)-2-thiopseudouronium chloride
1,3-dicyclohexyl-2-(2,4-dibromobenzyl)-2-thiopseudouronium bromide
1,3-dicyclohexyl-2-(2,6-dibromobenzyl)-2-thiopseudouronium bromide
1,3-dicyclohexyl-2-(2,6-difluorobenzyl)-2-thiopseudouronium chloride
1,3-dicyclohexyl-2-(3,5-dibromobenzyl)-2-thiopseudouronium bromide
1,3-dicyclohexyl-2-(3,5-difluorobenzyl)-2-thiopseudouronium chloride
1,3-dicyclohexyl-2-(3-trifluoromethyl-4-cyanobenzyl)-2-thiopseudouronium chloride
1,3-dicyclohexyl-2-(3-trifluoromethyl-4-chlorobenzyl)-2-thiopseudouronium chloride
1,3-dicyclohexyl-2-(3-trifluoromethyl-4-fluorobenzyl)-2-thiopseudouronium chloride
1,3-dicyclohexyl-2-(3-trifluoromethyl-4-bromobenzyl)-2-thiopseudouronium bromide
1,3-dicyclohexyl-2-(3-trifluoromethyl-4-nitrobenzyl)-2-thiopseudouronium chloride
1,3-dicyclohexyl-2-(2-chloro-4-trifluoromethylbenzyl)-2-thiopseudouronium chloride
1,3-dicyclohexyl-2-(2-bromo-4-trifluoromethylbenzyl)-2-thiopseudouronium bromide
1,3-dicyclohexyl-2-(2-fluoro-4-trifluoromethylbenzyl)-2-thiopseudouronium chloride
1,3-dicyclohexyl-2-(2-nitro-4-trifluoromethylbenzyl)-2-thiopseudouronium chloride
1,3-dicyclohexyl-2-(3-chloro-4-trifluoromethylbenzyl)-2-thiopseudouronium chloride
1,3-dicyclohexyl-2-(3-bromo-4-trifluoromethylbenzyl)-2-thiopseudouronium bromide
1,3-dicyclohexyl-2-(3-fluoro-4-trifluoromethylbenzyl)-2-thiopseudouronium chloride
1,3-dicyclohexyl-2-(2-trifluoromethyl-4-cyanobenzyl)-2-thiopseudouronium chloride
1,3-dicyclohexyl-2-(2-trifluoromethyl-4-chlorobenzyl)-2-thiopseudouronium chloride
1,3-dicyclohexyl-2-(2-trifluoromethyl-4-fluorobenzyl)-2-thiopseudouronium chloride
1,3-dicyclohexyl-2-(2-trifluoromethyl-4-bromobenzyl)-2-thiopseudouronium bromide
1,3-dicyclohexyl-2-(2-trifluoromethyl-4-nitrobenzyl)-2-thiopseudouronium chloride
1,3-dicyclohexyl-2-(2-chloro-4-nitrobenzyl)-2-thiopseudouronium chloride
1,3-dicyclohexyl-2-(2-bromo-4-nitrobenzyl)-2-thiopseudouronium bromide
1,3-dicyclohexyl-2-(2-fluoro-4-nitrobenzyl)-2-thiopseudouronium chloride 1,3-dicyclohexyl-2-(3-cyano-4-nitrobenzyl)-2-thiopseudouronium chloride
1,3-dicyclohexyl-2-(3-chloro-4-nitrobenzyl)-2-thiopseudouronium chloride
1,3-dicyclohexyl-2-(3-bromo-4-nitrobenzyl)-2-thiopseudouronium bromide
1,3-dicyclohexyl-2-(3-fluoro-4-nitrobenzyl)-2-thiopseudouronium chloride
1,3-dicyclohexyl-2-(3-trifluoromethyl-4-nitrobenzyl)-2-thiopseudouronium chloride
1,3-dicyclohexyl-2-(3-nitro-4-bromobenzyl)-2-thiopseudouronium bromide
1,3-dicyclohexyl-2-(2,6-dichloro-α-methylbenzyl)-2-thiopseudouronium chloride
1,3-dicyclohexyl-2-(3,5-ditrifluoromethylbenzyl)-2-thiopseudouronium chloride
1,3-dicyclohexyl-2-(3,4,5-trimethoxybenzyl)-2-thiopseudouronium chloride
1,3-dicyclohexyl-2-(2,4,6-tribromobenzyl)-2-thiopseudouronium bromide
1,3-dicyclohexyl-2-(2,6-dibromo-4-chlorobenzyl)-2-thiopseudouronium bromide
1,3-dicyclohexyl-2-(2,6-dichloro-4-bromobenzyl)-2-thiopseudouronium bromide
1,3-dicyclohexyl-2-(2,6-dichloro-4-trifluoromethylbenzyl)-2-thiopseudouronium chloride
1,3-dicyclohexyl-2-(2,6-dichloro-4-fluorobenzyl)-2-thiopseudouronium chloride
1,3-dicyclohexyl-2-(2,4-dichloro-6-nitrobenzyl)-2-thiopseudouronium chloride
1,3-dicyclohexyl-2-(p-chloro-α-methylbenzyl)-2-thiopseudouronium chloride
1,3 dicyclohexyl-2-(p-bromo-α-methylbenzyl)-2-thiopseudouronium bromide
1,3-dicyclohexyl-2-(2,6-dichloro-α-methylbenzyl)-2-thiopseudouronium chloride
1,3-dicyclohexyl-2-(2,6,4'-trichloro-4-dibenzyl)-2-thiopseudouronium chloride
1,3-dicyclohexyl-2-(2,6-dichloro-4-phenoxybenzyl)-2-thiopseudouronium chloride
1,3-dicyclohexyl-2-(p-methoxyphenethyl)-2-thiopseudouronium chloride
1,3-dicyclohexyl-2-(2,4-difluorobenzyl)-2-thiopseudouronium chloride
1,3-dicyclohexyl-2-(3-trifluoromethyl-4-chlorobenzyl)-2-thiopseudouronium chloride
1,3-dicyclopropylmethyl-2-(3-trifluoromethyl-4-chlorobenzyl)-2-thiopseudouronium chloride
1,3-dimethyl-2-(3-trifluoromethyl-4-chlorobenzyl)-2-thiopseudouronium chloride
1,3-dihexyl-2-(3-trifluoromethyl-4-chlorobenzyl)-2-thiopseudouronium chloride
1-methyl-1,3-dicyclohexyl-2-(3-trifluoromethyl-4-chlorobenzyl)-2-thiopseudouronium chloride The compounds of this invention may be prepared by the following general procedures.

Condensation of an N-substituted thiourea with an aralkylhalide results in the corresponding N-substituted aralkyl thiopseudouronium halide.

The following reaction equations illustrate this synthesis:

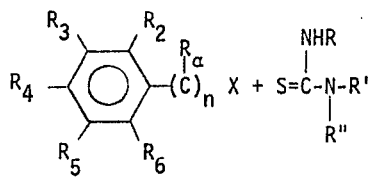

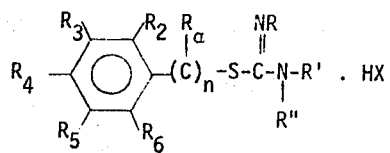

where:
HX is hydrohalic acid.

The reaction is preferably carried out on the aralkyl bromide or chloride using a solvent and with increased temperatures. The reaction is preferably carried out in an inert atmosphere preferably nitrogen or carbon dioxide. The solvent should be one that is miscible with the reactants and is convenient to use the reactant halide in excess as the solvent or alternatively a high boiling pilar medium such as phenol, acetonitrile, dimethylformamide, dimethylsulfoxide, methylethylketone, isopropanol, 2-nitropropane, etc. The reaction temperature may vary from room temperature with readily reactive reactants to about 250°C, although it is preferable to run the reaction at temperatures from about 50°C to 150°C. The isolation of the desired N-substituted thiopseudouronium halide can be carried out by distilling off the solvent in vacuo and precipitating the thiopseudouronium halide by the addition of a hydrocarbon liquid such as n-pentane, n-hexane, cyclohexane, etc. Other anions can be produced by exchange of the halide with alkali or alkaline earth salts containing the appropriate anion. The free base may be isolated by a quantitative addition of an aqueous base such as sodium hydroxide and the desired product separated with a suitable organic solvent such as ether, chloroform, etc.

The starting materials employed in these foregoing methods are either known compounds or they may be prepared by the following reaction sequences.

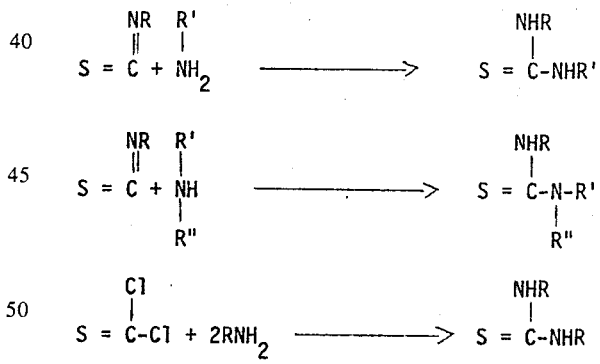

where R, R' and R'' are not all hydrogen at the same time and are as described above.

The isothiocyanates are reacted with ammonia or a primary or secondary amine in the conventional manner. The symmetrical N-substituted-thioureas are also prepared conventionally from thiophosgene and the primary amine or from the isothiocyanate and 2 primary amine.

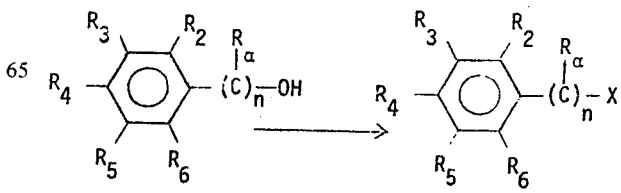

where $R_2$, $R_3$, $R_4$, $R_5$, $R_6$ and $R_\alpha$ are as described above and $n$ is 1-2.

The reaction is normally carried out by treating a benzene solution of a benzyl or phenethyl alcohol with phosphorous trihalide, phosphorous oxyhalide, phosphorous pentahalide, thiomyhalide or sulfuryl halide at reflux temperature for about 1 hour. This can also be performed in other inert solvents (such as toluene, chloroform, carbon tetrachloride, etc.) or by using excess halogenating agent as solvent. A temperature from about 50°C to 150°C is satisfactory. The benzyl alcohols may be prepared by the following reaction sequence.

Diazotization of an aromatic amine in the conventional manner followed by a Sandmeyer type displacement produces the nitrile, which is then hydrolyzed to the carboxylic acid. Rosenmund reduction of the carboxylic acid results in the aldehyde which in turn is interacted with the desired Grignard reagent and oxidized to obtain the α-substituted ketone. This is then reduced catalytically to the α-substituted benzyl alcohol. Lithium aluminum hydride reduction of the benzoic acid results in the benzyl alcohol.

The phenethylhalide starting materials may be prepared in an analogous manner starting with the substituted α-phenylalkanoic acid.

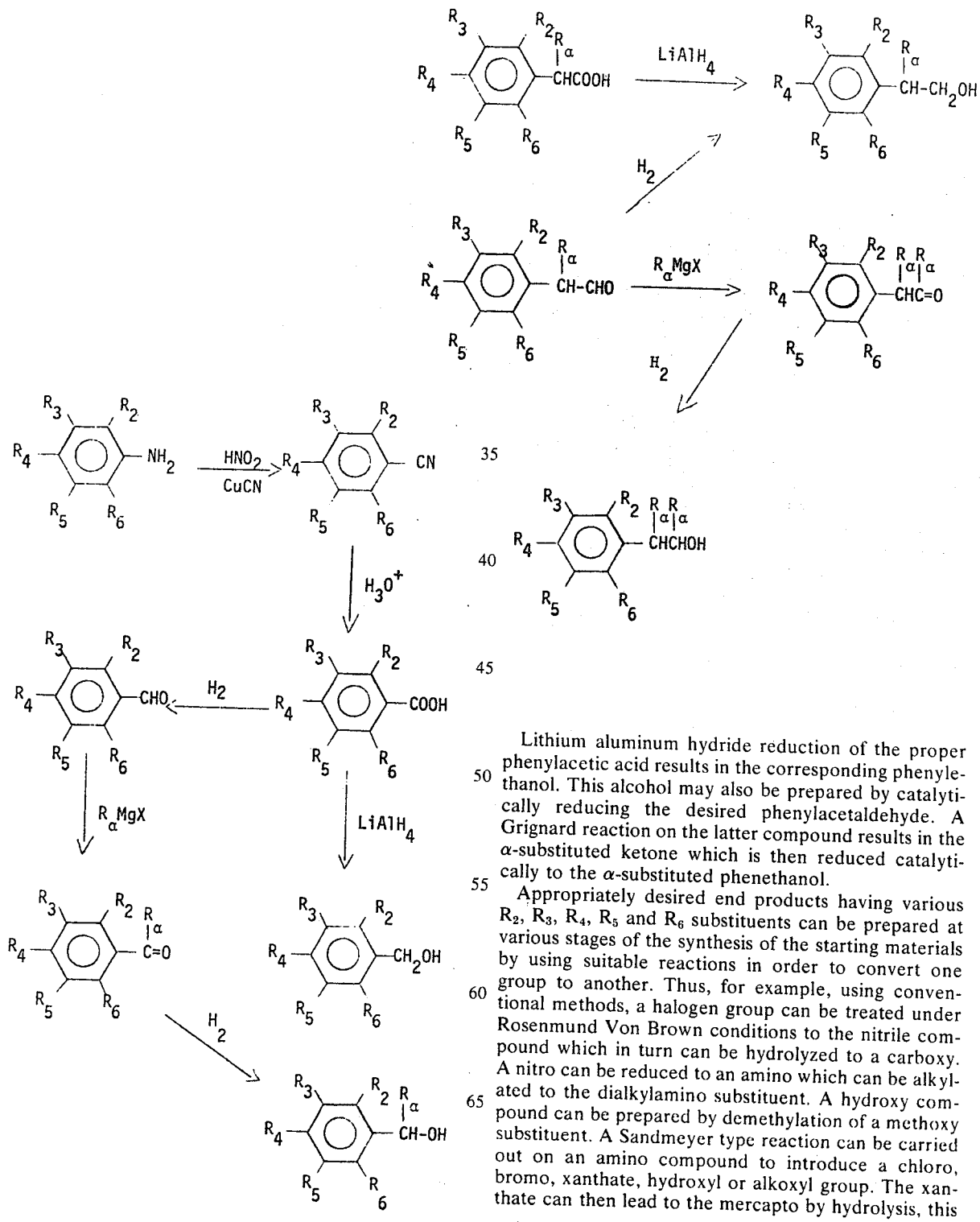

Lithium aluminum hydride reduction of the proper phenylacetic acid results in the corresponding phenylethanol. This alcohol may also be prepared by catalytically reducing the desired phenylacetaldehyde. A Grignard reaction on the latter compound results in the α-substituted ketone which is then reduced catalytically to the α-substituted phenethanol.

Appropriately desired end products having various $R_2$, $R_3$, $R_4$, $R_5$ and $R_6$ substituents can be prepared at various stages of the synthesis of the starting materials by using suitable reactions in order to convert one group to another. Thus, for example, using conventional methods, a halogen group can be treated under Rosenmund Von Brown conditions to the nitrile compound which in turn can be hydrolyzed to a carboxy. A nitro can be reduced to an amino which can be alkylated to the dialkylamino substituent. A hydroxy compound can be prepared by demethylation of a methoxy substituent. A Sandmeyer type reaction can be carried out on an amino compound to introduce a chloro, bromo, xanthate, hydroxyl or alkoxyl group. The xanthate can then lead to the mercapto by hydrolysis, this in turn can be alkylated to an alkylthio group which can be oxidized to alkylsulfinyl and alkylsulfonyl groups. A thiocyanato group may be reduced to a mercapto. An iodo group may be removed by catalytic hydrogenation.

I have found that the compounds of this invention have useful anti-ulcerogenic properties. Further, they have an effective degree of gastric anti-secretory activity, i.e., they reduce the volume and the acidity of the gastric fluid in humans and mammals. Still further, these compounds produce a considerable spasmolytic action on the gastrointestinal musculature, i.e., they reduce the peristaltic action of the gastrointestinal musculature which is manifested by a delay in gastric emptying time.

Until now, the known anti-ulcerogenic compounds which show gastric anti-secretory and gastrointestinal spasmolytic action have included such agents as atropine, homatropine, propantheline, dicyclomine, etc. These compounds, however, cause accompanying undesirable anti-cholinergic properties such as mydriasis, xerostomia, cyclopegia, etc.

I have found that the thiopseudouronium compounds of this invention are particularly useful as anti-secretory, anti-spasmodic and anti-ulcerogenic agents because they are essentially devoid of these unwanted effects.

In particular, the thiopseudouronium compounds, as herein described, are useful in the treatment of such gastrointestinal disorders and diseases as duodenal and peptic ulcers.

For all these purposes, the thiopseudouronium compounds of this invention can be administered orally or parenterally, but they are preferably administered orally. Orally, the may be administered as tablets, aqueous or oily suspension, dispersible powders or granules, emulsions, hard and soft capsules, or syrups or elixirs. The term parenteral, as used herein, includes subcutaneous injection, intromuscular injection or infusion techniques.

Compositions intended for oral use may be prepared according to any method known to the art for the manufacture of pharmaceutical compositions and such compositions may contain one or more agents selected from the group consisting of sweetening agents, flavoring agents, coloring agents and preserving agents, in order to provide a pharmaceutically elegant and palatable preparation.

Further, these compounds may be tableted or otherwise formulated so that for every 100 parts by weight of the composition, there are present between 5 and 95 parts by weight of the active ingredient. The dosage unit form will generally contain between about 1 mg and about 500 mg of the active ingredient of this invention. The preferred unit dose is between about 10 mg and 100 mg.

The dosage regimen in carrying out the methods of this invention is that which insures maximum therapeutic response until improvement is obtained and thereafter the minimum effective level which gives relief. Thus, in general, the dosages are those that are therapeutically effective in the treatment of ulcerogenic disease conditions or symptoms, such as duodenal and peptic ulcers. In general, the daily dose can be between about 0.1 mg/kg and 50 mg/kg (preferably in the range of 1–25 mg/kg/day). Bearing in mind, of course, that in selecting the appropriate dosage in any specific case, consideration must be given to the patient's weight, general health, age and other factors which may influence response to the drug.

Various tests in animals have been carried out to show the ability of the compounds of this invention to exhibit reactions that can be correlated with anti-ulcerogenic activity in humans. These tests involve such as the effect of the thiopseudouronium compounds on gastric secretion, gastrointestinal spasm and their effect against ulcerogenic agents. It has been found that the compounds of this invention when tested in the above variety of situations show a marked activity.

One such test is the gastric secretion test. This test is carried out as follows: Shay rats are fasted for 4–8 hours, and water is given ad lib. The rats are selected at random and separated into groups of 10. The animals are treated intraduodenally (I.D.) with the test compound of the vehicle immediately subsequent to the ligation of the stomach at the pyloric sphincter. The animals are sacrificed with chloroform at 4 hours post-drug administration, the stomach is removed and its contents are assayed for volume, pH and total acids.

A second gastric secretion test is carried out on dogs. This is outlined in the Handbook of Physiology, Section 6: Alimentary Canal, Volume II: Secretion, American Physiology Society, Washington, D.C. 1967.

It has been found that the compounds of this invention when subjected to the above gastric secretion tests display a marked ability to decrease gastric volume and gastric acidity. These tests are known to correlate well with gastric activity in humans and is a standard test used to determine anti-secretory properties.

To determine the anti-ulcer effectiveness, the following test is employed: Male Wistar rats (130–150 grams) are fasted for 24 hours, then given reserpine at 5 mg/kg i.p 24 hours later, the stomachs are removed and examined for ulceration. Ulcers are graded on a 0–4 scale and the number of ulcers is recorded. Pretreatment with the thiopseudouronium compounds of this ivention produces a decrease in ulcer grade and the number of ulcers compared to the control reserpine-treated rats.

Determination of anti-spasmodic properties can be carried out by the procedure as outlined by D. A. Brodie and S. K. Kundrats in their article entitled "Effect of Drugs on Gastric Emptying in Rats", *Fed. Proc.* 24:714 (1965).

Mydriasis is detected by the procedure R. A. Turner, *Screening Methods in Pharmacology*, Academic Press, New York and London, pp. 174–5, 1965. Acute toxicity is calculated according to the standard Litchfield-Wilcoxon procedure.

In view of the results of these tests, the pharmacological data clearly indicates that the N-substituted-2-aralkyl-2-thiopseudouronium compounds of this invention can be considered to be effective anti-ulcerogenic, gastric anti-secretory, and anti-spasmodic agents which are substantially free of anti-cholinergic side effects and having a low toxicity.

Tests in animals have also been carried out to show the ability of compounds of this invention to inhibit reactions that can be correlated with hypertensive effects in humans. One such test is outlined by Jacques de Champlain, Lawrence R. Krahoff and Julius Axelrod in *Circulation Research* XXIII:479 (1968). This testing method is known to correlate well with hypertensive activity in humans and is a standard test used to determine antihypertensive properties. In view of the results of this test, the thiopseudouronium compounds of this invention can be considered to be active antihypertensive agents.

To determine the CNS depressant effectiveness of the compounds of Formula I, the suppression of spontaneous motor activity is evaluated in normal mice (18-22 g) and immature rats (90-100 g) by a modification of the Dew method: Dews, *Brit. J. Pharmacol:* 8, 46 (1953). Results of this test indicates that a relative increase in depressant activity is evident.

The following are detailed examples which show the preparation of the compounds of this invention. They are to be construed as illustrations of said compounds and not as limitations thereof.

EXAMPLE 1

Cyclohexylathiourea

To a solution of 70 ml (1 mole of ammonia) of concentrated ammonia hydroxide solution is added 91.5 g (0.65 mls) of cyclohexylisothiocyanate over a period of about 1 hour. The solution is then gently heated to remove any excess ammonia. The solution is then heated with charcoal filtered and the filtrate chilled in an ice bath. The product is collected and washed with water to obtain cyclohexylthiourea.

When the above procedure is followed but cyclohexyl isothiocyanate is replaced by the isothiocyanate compounds of Table 1 below, then the corresponding thiourea compound is prepared.

TABLE 1 methyl isothiocyanate
ethyl isothiocyanate
propyl isothiocyanate
i-propyl isothiocyanate
butyl isothiocyanate
i-butyl isothiocyanate
sec-butyl isothiocyanate
t-butyl isothiocyanate
pentyl isothiocyanate
hexyl isothiocyanate
heptyl isothiocyanate
octyl isothiocyanate
nonyl isothiocyanate
decyl isothiocyanate
undecyl isothiocyanate
dodecyl isothiocyanate
tridecyl isothiocyanate
tetradecyl isothiocyanate
pentadecyl isothiocyanate
allyl isothiocyanate
methally isothiocyanate
(2,4-pentadienyl) isothiocyanate
2-butenyl isothiocyanate
4-butenyl isothiocyanate
4-pentenyl isothiocyanate
propynl isothiocyanate
propargyl isothiocyanate
5-hexynyl isothiocyanate
cyclohex-2-enylmethyl isothiocyanate
(2,4-cyclopentadienyl) isothiocyanate
cyclopropyl isothiocyanate
cyclobutyl isothiocyanate
cyclopentyl isothiocyanate
cyclohexyl isothiocyanate
cycloheptyl isothiocyanate
cyclooctyl isothiocyanate
cyclononyl isothiocyanate
cyclodecyl isothiocyanate
3,5,5-trimethylheptyl isothiocyanate
2-methylheptyl isothiocyanate
3-methylheptyl isothiocyanate
2,2,3,3-tetramethylbutyl isothiocyanate
2-methyl-1-butenyl isothiocyanate
(2-methylcyclopropyl)isothiocyanate
cyclopropylmethyl isothiocyanate
2-ethylcyclopropylmethyl isothiocyanate
cyclobutylmethyl isothiocyanate
cyclohexylmethyl isothiocyanate
2-cyclohexenyl isothiocyanate
4-cyclohexenyl isothiocyanate
2-cyclohexenylmethyl isothiocyanate
2-cycloheptenyl isothiocyanate
2-cyclooctenyl isothiocyanate
2,4-cyclopentadienylmethyl isothiocyanate
2-bicyclo[3.2.1]octyl isothiocyanate
2-spiro[3.4]octyl isothiocyanate

EXAMPLE 2

1-Cyclohexyl-3-methylthiourea

A solution of 36.5 g (0.5 mole) of methyl isothiocyanate is added to 74.3 g (0.75 mole) of cyclohexylamine. The solution is heated on a steam bath for 20 min. and then 50 ml of 95% ethanol is added. The solution is treated with charcoal, filtered and allowed to cool. The product is then collected and washed with cold 95% ethanol to obtain 1-cyclohexyl-3-methylthiourea.

When cyclohexylamine in the above example is replaced by the amines of Table 1 below, then the corresponding thiourea product is obtained.

Table 1

| | |
|---|---|
| methylamine | decylamine |
| ethylamine | undecylamine |
| propylamine | dodecylamine |
| i-propylamine | tridecylamine |
| butylamine | tetradecylamine |
| i-butylamine | pentadecylamine |
| sec-butylamine | 3,5,5-trimethylheptylamine |
| t-butylamine | cyclopropylamine |
| pentylamine | cyclobutylamine |
| hexylamine | cyclopentylamine |
| heptylamine | cyclohexylamine |
| octylamine | cycloheptylamine |
| nonylamine | cyclooctylamine |
| cyclononylamine | 2-butenylamine |
| cyclodecylamine | 4-pentenylamine |
| cycloundecylamine | 3,5-heptadienylamine |
| cyclododecylamine | isooctenylamine |
| cyclotridecylamine | 2-propylallylamine |
| cyclotetradecylamine | 5-hexynylamine |
| cyclopentadecylamine | 4-methyl-3-penten-1-ylamine |
| 2-cyclohexenylamine | allylamine |
| 4-cyclohexenylamine | methallylamine |
| 2-cycloheptenylamine | pent-4-enylamine |
| cyclopropylmethylamine | propynylamine |
| cyclobutylmethylamine | propargylamine |
| cyclopentylmethylamine | cyclohexylmethylamine |
| cyclobutylethylamine | 2-cyclohexenylmethylamine |
| 2-methylheptylamine | 2,4-cyclopentadienylmethylamine |
| 3-methylheptylamine | 2-cyclooctenylamine |
| 2,2,3,3-tetramethylbutylamine | 2-bicyclo[3.2.1]octyl |
| 2-methyl-2-butenylamine | 2-sprio[3.4]octyl |

When methylisothiocyanate in the above example is replaced by the isothiocyanates of Example 1, then the corresponding product is obtained.

EXAMPLE 3

1,3-Dicyclohexylthiourea

A solution of 91.5 g (0.65 moles) of cyclohexyl isothiocyanate is added to 99 g (1 mole) of cyclohexylamine. The solution is then gently heated on a steam bath for one-half hour, and then 40 ml of 95% ethanol is added, treated with charcoal while hot, filtered and allowed to cool. The product is then collected and washed with cold 95% ethanol to obtain 1,3-dicyclohexylthiourea.

When the 1,3-symmetrical thioureas are desired the corresponding amine from Table I, Example 2 is combined with the isothiocyanate of Table I, Example 1.

EXAMPLE 4

1,1-Dicyclohexyl-3-methylthiourea

When the procedure of Example 2 is followed but dicyclohexylamine is used in place of cyclohexylamine then the product obtained is 1,1-dicyclohexyl-3-methylthiourea.

When dicyclohexylamine is substituted in the above example for the amines of Table 1 below and methylisothiocyanate is replaced by the isothiocyanates of Table 1, Example 1 then the corresponding product is obtained.

Table 1 dimethylamine
diethylamine
dipropylamine
di-i-propylamine
dibutylamine
di-i-butylamine
di-sec-butylamine
dipentylamine
dihexylamine
diheptylamine
dioctylamine
dinonylamine
didecylamine
diundecylamine
didodecylamine
ditridecylamine
ditetradecylamine
dipentadecylamine
diallylamine
di-(2-butenyl)amine
di-(4-pentenyl)amine
diisoctenylamine
di-(2-methyl-2-butenyl)amine
di-(2-propylallyl)amine
di-(5-hexynyl)amine
dicyclopropylamine
dicyclobutylamine
dicyclopentylamine
dicyclohexylamine
dicycloheptylamine
dicyclooctylamine
di-(2-cyclohexenyl)amine
dicyclopropylmethylamine
dicyclobutylmethylamine
dicyclopent-2,4-dienylmethylamine
dicyclohex-2-enylmethylamine
di-(2-bicyclo[3.2.1]octylamine
di-(2-spiro[3.4]octylamine
azacyclopentaneamine
piperdineamine
4-methylpiperdineamine
homopiperdineamine
azacyclooctaneamine
azacyclononaneamine
azacyclodecaneamine

EXAMPLE 5

1,3-Dicyclohexyl-1-methylthiourea

When the procedure of Example 2 is followed but N-cyclohexyl-N-methylamine is used in place of cyclohexylamine then the product obtained is 1,3-dicyclohexyl-1-methylthiourea.

When N-cyclohexyl-N-methylamine in the above example is replaced by the amines in Table 1 below and methylisothiocyanate is replaced by the isothiocyanates of Table 1, Example 1, then the corresponding product is obtained.

Table 1

N-ethyl-N-cyclohexylamine
N-propyl-N-cyclohexylamine
N-i-propyl-N-cyclohexylamine
N-butyl-N-cyclohexylamine
N-i-butyl-N-cyclohexylamine
N-sec-butyl-N-cyclohexylamine
N-t-butyl-N-cyclohexylamine
N-pentyl-N-cyclohexylamine
N-hexyl-N-cyclohexylamine
N-heptyl-N-cyclohexylamine
N-octyl-N-cyclohexylamine
N-methyl-N-ethylamine
N-methyl-N-propylamine
N-methylN-i-propylamine
N-methyl-N-butylamine
N-methyl-N-i-butylamine
N-methyl-N-sec-butylamine
N-methyl-N-t-butylamine
N-methyl-N-pentylamine
N-methyl-N-hexylamine
N-methyl-N-heptylamine
N-methyl-N-octylamine
N-cyclopropyl-N-methylamine
N-cyclobutyl-N-methylamine
N-cyclopentyl-N-methylamine
N-cycloheptyl-N-methylamine
N-cyclooctyl-N-methylamine
N-cycloallyl-N-cyclohexylamine
N-cyclomethallyl-N-cyclohexylamine
N-cyclopropargyl-N-cyclohexylamine
N-cyclo(2-propylallyl)-N-cyclohexylamine
N-cyclo(2-cyclohexenyl)-N-cyclohexylamine
N-cyclopropylmethyl-N-cyclohexylamine

EXAMPLE 6

1,1-Dicyclohexylthiourea

When the procedure of Example 4 is followed but thiocyanic acid is used in place of methylisothiocyanate than the product obtained is 1,1-dicyclohexylthiourea.

When the 1,1-symmetrical thioureas are desired the corresponding amine from Table 1, Example 4 is used.

EXAMPLE 7

2,6-Dichlorobenzyl chloride

To a refluxing solution of 60 ml (0.83 mole) of thionyl chloride is added 26.6 g (0.11 mole) of 2,6-dichlorobenzyl alcohol. The mixture is refluxed for 3 hours, cooled to room temperature and the excess thionyl chloride is removed. The residue is then added to 50 ml of ice water, the organic phase is extracted with ether, worked with sodium bicarbonate solution and water. The ether is then dried over magnesium sulfate and evaporated to dryness to obtain 2,6-dichlorobenzyl chloride.

When the above reaction is followed using the appropriate thionyl halide, sulfuryl halide, phosphorous oxyhalide, phosphorous pentahalide or phosphorous trihalide in place of thionyl chloride and the alcohols of Table 1, below, then the corresponding halide of Table 2 below is prepared.

Table 1 p-trifluoromethylbenzyl alcohol
p-trifluoromethoxybenzyl alcohol
p-trifluoroacetylbenzyl alcohol
p-trifluoromethylsulfonylbenzyl alcohol
o-chlorobenzyl alcohol
m-chlorobenzyl alcohol
p-chlorobenzyl alcohol
2,3-dichlorobenzyl alcohol
2,4-chlorobenzyl alcohol
2,5-chlorobenzyl alcohol
2,6-chlorobenzyl alcohol
3,4-chlorobenzyl alcohol
3,5-chlorobenzyl alcohol
2,3,4-trichlorobenzyl alcohol
2,3,5-trichlorobenzyl alcohol
2,3,6-trichlorobenzyl alcohol
2,4,5-trichlorobenzyl alcohol
2,4,6-trichlorobenzyl alcohol
3,4,5-trichlorobenzyl alcohol
2,3,5,6-tetrafluorobenzyl alcohol
2,2,4,5,6-pentafluorobenzyl alcohol
o-nitrobenzyl alcohol
m-nitrobenzyl alcohol
p-nitrobenzyl alcohol
p-dimethylaminobenzyl alcohol
p-cyanobenzyl alcohol
o-methoxybenzyl alcohol
p-methoxybenzyl alcohol
p-carbathoxybenzyl alcohol
p-acetoxybenzyl alcohol
p-phenoxybenzyl alcohol
p-(4-chlorophenoxy)benzyl alcohol
p-(4-chlorophenyl)benzyl alcohol
p-acetamidobenzyl alcohol
p-thiocyanatobenzyl alcohol
p-methylthiobenzyl alcohol
p-dimethylsulfonamidobenzyl alcohol
o-bromobenzyl alcohol
m-bromobenzyl alcohol
p-bromobenzyl alcohol
o-fluorobenzyl alcohol
m-fluorobenzyl alcohol
p-fluorobenzyl alcohol
o-iodobenzyl alcohol
2,5-dinitrobenzyl alcohol
2,4-difluorobenzyl alcohol
2,4-dibromobenzyl alcohol
2,6-dibromobenzyl alcohol
2,6-difluorobenzyl alcohol
3,5-dibromobenzyl alcohol
3,5-difluorobenzyl alcohol
3-trifluoromethyl-4-cyanobenzyl alcohol
3-trifluoromethyl-4-chlorobenzyl alcohol
3-trifluoromethyl-4-fluorobenzyl alcohol
3-trifluoromethyl-4-bromobenzyl alcohol
3-trifluoromethyl-4-nitrobenzyl alcohol
2-chloro-4-trifluoromethylbenzyl alcohol
2-bromo-4-trifluoromethylbenzyl alcohol
2-fluoro-4-trifluoromethylbenzyl alcohol
2-nitro-4-trifluoromethylbenzyl alcohol
3-chloro-4-trifluoromethylbenzyl alcohol
3-bromo-4-trifluoromethylbenzyl alcohol
3-fluoro-4-trifluoromethylbenzyl alcohol
2-trifluoromethyl-4-cyanobenzyl alcohol
2-trifluoromethyl-4-chlorobenzyl alcohol
2-trifluoromethyl-4-fluorobenzyl alcohol
2-trifluoromethyl-4-bromobenzyl alcohol
2-trifluoromethyl-4-nitrobenzyl alcohol
2-chloro-4-nitrobenzyl alcohol
2-bromo-4-nitrobenzyl alcohol
2-fluoro-4-nitrobenzyl alcohol
3-cyano-4-nitrobenzyl alcohol
3-chloro-4-nitrobenzyl alcohol
3-bromo-4-nitrobenzyl alcohol
3-fluoro-4-nitrobenzyl alcohol
3-trifluoromethyl-4-nitrobenzyl alcohol
3-nitro-4-bromobenzyl alcohol Table 2 p-trifluoromethylbenzyl chloride
p-trifluoromethoxybenzyl chloride
p-trifluoroacetylbenzyl chloride
p-trifluoromethylsulfonylbenzyl chloride
o-chlorobenzyl chloride
m-chlorobenzyl chloride
p-chlorobenzyl chloride
2,3-dichlorobenzyl chloride
2,4-chlorobenzyl chloride
2,5-chlorobenzyl chloride
2,6-chlorobenzyl chloride
3,4-chlorobenzyl chloride
3,5-chlorobenzyl chloride
2,3,4-trichlorobenzyl chloride
2,3,5-trichlorobenzyl chloride
2,3,6-trichlorobenzyl chloride
2,4,5-trichlorobenzyl chloride
2,4,6-trichlorobenzyl chloride
3,4,5-trichlorobenzyl chloride
2,3,5,6-tetrafluorobenzyl chloride
2,2,4,5,6-pentafluorobenzyl chloride
o-nitrobenzyl chloride
m-nitrobenzyl chloride
p-nitrobenzyl chloride
p-dimethylaminobenzyl chloride
p-cyanobenzyl chloride
o-methoxybenzyl chloride
p-methoxybenzyl chloride
p-carbathoxybenzyl chloride
p-acetoxybenzyl chloride
p-phenoxybenzyl chloride
p-(4-chlorophenoxy)benzyl chloride
p-(4-chlorophenyl)benzyl chloride
p-acetamidobenzyl chloride
p-thiocyanatobenzyl chloride
p-methylthiobenzyl chloride
p-dimethylsulfonamidobenzyl chloride
o-bromobenzyl bromide
m-bromobenzyl bromide
p-bromobenzyl bromide o-fluorobenzyl chloride
m-fluorobenzyl chloride
p-fluorobenzyl chloride
o-iodobenzyl chloride
2,5-dinitrobenzyl chloride
2,4-difluorobenzyl chloride
2,4-dibromobenzyl bromide
2,6-dibromobenzyl bromide
2,6-difluorobenzyl chloride
3,5-dibromobenzyl bromide
3,5-difluorobenzyl chloride
3-trifluoromethyl-4-cyanobenzyl chloride
3-trifluoromethyl-4-chlorobenzyl chloride
3-trifluoromethyl-4-fluorobenzyl chloride
3-trifluoromethyl-4-bromobenzyl bromide
3-trifluoromethyl-4-nitrobenzyl chloride
2-chloro-4-trifluoromethylbenzyl chloride
2-bromo-4-trifluoromethylbenzyl bromide
2-fluoro-4-trifluoromethylbenzyl chloride
2-nitro-4-trifluoromethylbenzyl chloride
3-chloro-4-trifluoromethylbenzyl chloride
3-bromo-4-trifluoromethylbenzyl bromide
3-fluoro-4-trifluoromethylbenzyl chloride
2-trifluoromethyl-4-cyanobenzyl chloride
2-trifluoromethyl-4-chlorobenzyl chloride
2-trifluoromethyl-4-fluorobenzyl chloride
2-trifluoromethyl-4-bromobenzyl bromide
2-trifluoromethyl-4-nitrobenzyl chloride
2-chloro-4-nitrobenzyl chloride
2-bromo-4-nitrobenzyl bromide
2-fluoro-4-nitrobenzyl chloride
3-cyano-4-nitrobenzyl chloride
3-chloro-4-nitrobenzyl chloride
3-bromo-4-nitrobenzyl bromide
3-fluoro-4-nitrobenzyl chloride
3-trifluoromethyl-4-nitrobenzyl chloride
3-nitro-4-bromobenzyl bromide

EXAMPLE 8

1,3-Dicyclohexyl-2-(2,6-dichlorobenzyl)-2-thiopseudouronium chloride

A mixture of 9.77 g (0.05 mole) of 2,6-dichlorobenzylchloride and 12 g (0.05 mole) of 1,3-dicyclohexylthiourea in 150 ml of absolute ethanol is refluxed for 48 hours. The ethanol is then removed in vacuo and the residue is triturated with ether and filtered. Reprecipitation from acetone-ether affords 1,3-dicyclohexyl-2-(2,6-dichlorobenzyl)-2-thiopseudouronium chloride.

EXAMPLE 9

When 1,3-dicyclohexylthiourea in Example 8 is replaced by the thioureas prepared in Examples 1–6, then the corresponding 2-(2,6-dichlorobenzyl)-2-thiopseudouronium chloride is prepared. A representative list of the compounds prepared is shown in Table 1 below.

Table 1

1-methyl-2-(2,6-dichlorobenzyl)-2-thiopseudouronium chloride
1-ethyl-2-(2,6-dichlorobenzyl)-2-thiopseudouronium chloride
1-propyl-2-(2,6-dichlorobenzyl)-2-thiopseudouronium chloride
1-i-propyl-2-(2,6-dichlorobenzyl)-2-thiopseudouronium chloride
1-butyl-2-(2,6-dichlorobenzyl)-2-thiopseudouronium chloride
1-i-butyl-2-(2,6-dichlorobenzyl)-2-thiopseudouronium chloride
1-sec-butyl-2-(2,6-dichlorobenzyl)-2-thiopseudouronium chloride
1-t-butyl-2-(2,6-dichlorobenzyl)-2-thiopseudouronium chloride
1-pentyl-2-(2,6-dichlorobenzyl)-2-thiopseudouronium chloride
1-hexyl-2-(2,6-dichlorobenzyl)-2-thiopseudouronium chloride
1-heptyl-2-(2,6-dichlorobenzyl)-2-thiopseudouronium chloride
1-octyl-2-(2,6-dichlorobenzyl)-2-thiopseudouronium chloride
1-n-nyl-2-(2,6-dichlorobenzyl)-2-thiopseudouronium chloride
1-decyl-2-(2,6-dichlorobenzyl)-2-thiopseudouronium chloride
1-undecyl-2-(2,6-dichlorobenzyl)-2-thiopseudouronium chloride
1-dodecyl-2-(2,6-dichlorobenzyl)-2-thiopseudouronium chloride
1-tridecyl-2-(2,6-dichlorobenzyl)-2-thiopseudouronium chloride
1-tetradecyl-2-(2,6-dichlorobenzyl)-2-thiopseudouronium chloride
1-pentadecyl-2-(2,6-dichlorobenzyl)-2-thiopseudouronium chloride
1-allyl-2-(2,6-dichlorobenzyl)-2-thiopseudouronium chloride
1-methallyl-2-(2,6-dichlorobenzyl)-2-thiopseudouronium chloride
1-(4-pentenyl)-2-(2,6-dichlorobenzyl)-2-thiopseudouronium chloride
1-propargyl-2-(2,6-dichlorobenzyl)-2-thiopseudouronium chloride
1-cyclopropyl-2-(2,6-dichlorobenzyl)-2-thiopseudouronium chloride
1-cyclobutyl-2-(2,6-dichlorobenzyl)-2-thiopseudouronium chloride
1-cyclopentyl-2-(2,6-dichlorobenzyl)-2-thiopseudouronium chloride
1-cyclohexyl-2-(2,6-dichlorobenzyl)-2-thiopseudouronium chloride
1-cycloheptyl-2-(2,6-dichlorobenzyl)-2-thiopseudouronium chloride
1-cyclooctyl-2-(2,6-dichlorobenzyl)-2-thiopseudouronium chloride
1-(3,5,5-trimethylheptyl)-2-(2,6-dichlorobenzyl)-2-thiopseudouronium chloride
1-(2,2,3,3,-tetramethyl)-2-(2,6-dichlorobenzyl)-2-thiopseudouronium chloride
1-(cyclopropylmethyl)-2-(2,6-dichlorobenzyl)-2-thiopseudouronium chloride
1-(2-ethylcyclopropylmethyl)-2-(2,6-dichlorobenzyl)-2-thiopseudouronium chloride
1-(cyclobutylmethyl)-2-(2,6-dichlorobenzyl)-2-thiopseudouronium chloride
1-(cyclohexylmethyl)-2-(2,6-dichlorobenzyl)-2-thiopseudouronium chloride
1-(2-cyclohexenyl)-2-(2,6-dichlorobenzyl)-2-thiopseudouronium chloride
1-(2-cyclooctenyl)-2-(2,6-dichlorobenzyl)-2-thiopseudouronium chloride 1-(2-bicyclo[3.2.1]octyl)-2-(2,6-dichlorobenzyl)-2-thiopseudouronium chloride
1-(3,5-heptadienyl)-2-(2,6-dichlorobenzyl)-2-thiopseudouronium chloride
1-(2,4-cyclopentadienyl)-2-(2,6-dichlorobenzyl)-2-thiopseudouronium chloride
1-(2-spiro[3.4]octyl)-2-(2,6-dichlorobenzyl)-2-thiopseudouronium chloride
1-propynyl-2-(2,6-dichlorobenzyl)-2-thiopseudouronium chloride
1-(methyl-3-penten-1-yl)-2-(2,6-dichlorobenzyl)-2-thiopseudouronium chloride
1,3-dimethyl-2-(2,6-dichlorobenzyl)-2-thiopseudouronium chloride
1,3-diethyl-2-(2,6-dichlorobenzyl)-2-thiopseudouronium chloride
1,3-dipropyl-2-(2,6-dichlorobenzyl)-2-thiopseudouronium chloride
1,3-di-i-propyl-2-(2,6-dichlorobenzyl)-2-thiopseudouronium chloride
1,3-dibutyl-2-(2,6-dichlorobenzyl)-2-thiopseudouronium chloride
1,3-di-t-butyl-2-(2,6-dichlorobenzyl)-2-thiopseudouronium chloride
1,3-dipentyl-2-(2,6-dichlorobenzyl)-2-thiopseudouronium chloride
1,3-dihexyl-2-(2,6-dichlorobenzyl)-2-thiopseudouronium chloride
1,3-heptyl-2-(2,6-dichlorobenzyl)-2-thiopseudouronium chloride
1,3-dioctyl-2-(2,6-dichlorobenzyl)-2-thiopseudouronium chloride
1,3-di-(3,5,5-trimethylheptyl)-2-(2,6-dichlorobenzyl)-2-thiopseudouronium chloride
1,3-dicyclopropyl-2-(2,6-dichlorobenzyl)-2-thiopseudouronium chloride
1,3-dicyclohexyl-2-(2,6-dichlorobenzyl)-2-thiopseudouronium chloride
1,3-di(2-cyclohexenyl)-2-(2,6-dichlorobenzyl)-2-thiopseudouronium chloride
1,3-di(2-methylheptyl)-2-(2,6-dichlorobenzyl)-2-thiopseudouronium chloride
1,3-di(2,2,3,3-tetramethylbutyl)-2-(2,6-dichlorobenzyl)-2-thiopseudouronium chloride
1,3-di(4-pentenyl)-2-(2,6-dichlorobenzyl)-2-thiopseudouronium chloride
1,3-di(2-propylallyl)-2-(2,6-dichlorobenzyl)-2-thiopseudouronium chloride
1,3-diallyl-2-(2,6-dichlorobenzyl)-2-thiopseudouronium chloride
1,3-dimethallyl-2-(2,6-dichlorobenzyl)-2-thiopseudouronium chloride
1,3-dipropynyl-2-(2,6-dichlorobenzyl)-2-thiopseudouronium chloride
1,3-dicyclohexylmethyl-2-(2,6-dichlorobenzyl)-2-thiopseudouronium chloride
1,1-dimethyl-2-(2,6-dichlorobenzyl)-2-thiopseudouronium chloride
1,1-diethyl-2-(2,6-dichlorobenzyl)-2-thiopseudouronium chloride
1,1-dipropyl-2-(2,6-dichlorobenzyl)-2-thiopseudouronium chloride
1,1-dipentyl-2-(2,6-dichlorobenzyl)-2-thiopseudouronium chloride
1,1-dihexyl-2-(2,6-dichlorobenzyl)-2-thiopseudouronium chloride
1,1-di(4-pentenyl)-2-(2,6-dichlorobenzyl)-2-thiopseudouronium chloride
1,1-dicyclopropyl-2-(2,6-dichlorobenzyl)-2-thiopseudouronium chloride
1,1-dicyclobutyl-2-(2,6-dichlorobenzyl)-2-thiopseudouronium chloride
1,1-dicyclopentyl-2-(2,6-dichlorobenzyl)-2-thiopseudouronium chloride
1,1-dicyclohexyl-2-(2,6-dichlorobenzyl)-2-thiopseudouronium chloride
1,1-dicycloheptyl-2-(2,6-dichlorobenzyl)-2-thiopseudouronium chloride
1,1-dicyclooctyl-2-(2,6-dichlorobenzyl)-2-thiopseudouronium chloride
1,1-di(2-cyclohexenyl)-2-(2,6-dichlorobenzyl)-2-thiopseudouronium chloride
1,1-dicyclopropylmethyl-2-(2,6-dichlorobenzyl)-2-thiopseudouronium chloride
1,1-di(cyclohex-2-enylmethyl)-2-(2,6-dichlorobenzyl)-2-thiopseudouronium chloride
1,1-(pentamethylene)-2-(2,6-dichlorobenzyl)-2-thiopseudouronium chloride
1,1-(azadiethylene)-2-(2,6-dichlorobenzyl)-2-thiopseudouronium chloride
1,1-oxydiethylene-2-(2,6-dichlorobenzyl)-2-thiopseudouronium chloride
1,3-dimethyl-1-cyclohexyl-2-(2,6-dichlorobenzyl)-2-thiopseudouronium chloride
1,3-diethyl-1-cyclohexyl-2-(2,6-dichlorobenzyl)-2-thiopseudouronium chloride
1,3-dipropyl-1-cyclohexyl-2-(2,6-dichlorobenzyl)-2-thiopseudouronium chloride
1,3-dibutyl-1-cyclohexyl-2-(2,6-dichlorobenzyl)-2-thiopseudouronium chloride
1,3-dipentyl-1-cyclohexyl-2-(2,6-dichlorobenzyl)-2-thiopseudouronium chloride
1,3-dihexyl-1-cyclohexyl-2-(2,6-dichlorobenzyl)-2-thiopseudouronium chloride
1,3-diheptyl-1-cyclohexyl-2-(2,6-dichlorobenzyl)-2-thiopseudouronium chloride
1-cyclopropyl-1-methyl-3-ethyl-2-(2,6-dichlorobenzyl)-2-thiopseudouronium chloride
1-cyclohexyl-1-methyl-3-hexyl-2-(2,6-dichlorobenzyl)-2-thiopseudouronium chloride
1-cyclohexyl-1-methyl-3-ethyl-2-(2,6-dichlorobenzyl)-2-thiopseudouronium chloride
1,3-dicyclohexyl-1-methyl-2-(2,6-dichlorobenzyl)-2-thiopseudouronium chloride
1,3-dicyclohexyl-1-ethyl-2-(2,6-dichlorobenzyl)-2-thiopseudouronium chloride
1,3-dicyclohexyl-1-propyl-2-(2,6-dichlorobenzyl)-2-thiopseudouronium chloride
1,3-dicyclohexyl-1-hexyl-2-(2,6-dichlorobenzyl)-2-thiopseudouronium chloride
1,1,3-tricyclohexyl-2-(2,6-dichlorobenzyl)-2-thiopseudouronium chloride
1,1,3-trimethyl-2-(2,6-dichlorobenzyl)-2-thiopseudouronium chloride
1,1,3-tricyclopentyl-2-(2,6-dichlorobenzyl)-2-thiopseudouronium chloride
1,1-(pentamethylene)-3-cyclohexyl-2-(2,6-dichlorobenzyl)-2-thiopseudouronium chloride
1-cyclohexyl-1-methyl-3-methallyl-2-(2,6-dichlorobenzyl)-2-thiopseudouronium chloride
1-methyl-1-propargyl-3-methallyl-2-(2,6-dichlorobenzyl)-2-thiopseudouronium chloride

EXAMPLE 10

When 2,6-dichlorobenzyl chloride in Example 8 is replaced by the benzyl halides prepared in Example 7, then the corresponding product is prepared. A representative list of the compounds prepared is shown in Table 1 below.

Table 1

1,3-dicyclohexyl-2-(o-chlorobenzyl)-2-thiopseudouronium chloride
1,3-dicyclohexyl-2-(m-chlorobenzyl)-2-thiopseudouronium chloride
1,3-dicyclohexyl-2-(p-chlorobenzyl)-2-thiopseudouronium chloride
1,3-dicyclohexyl-2-(2,3-dichlorobenzyl)-2-thiopseudouronium chloride
1,3-dicyclohexyl-2-(2,4-dichlorobenzyl)-2-thiopseudouronium chloride
1,3-dicyclohexyl-2-(2,5-dichlorobenzyl)-2-thiopseudouronium chloride
1,3-dicyclohexyl-2-(3,4-dichlorobenzyl)-2-thiopseudouronium chloride
1,3-dicyclohexyl-2-(3,5-dichlorobenzyl)-2-thiopseudouronium chloride
1,3-dicyclohexyl-2-(2,3,4-dichlorobenzyl)-2-thiopseudouronium chloride
1,3-dicyclohexyl-2-(2,3,5-dichlorobenzyl)-2-thiopseudouronium chloride
1,3-dicyclohexyl-2-(2,3,6-dichlorobenzyl)-2-thiopseudouronium chloride
1,3-dicyclohexyl-2-(2,4,5-dichlorobenzyl)-2-thiopseudouronium chloride
1,3-dicyclohexyl-2-(2,4,6-dichlorobenzyl)-2-thiopseudouronium chloride
1,3-dicyclohexyl-2-(3,4,5-dichlorobenzyl)-2-thiopseudouronium chloride
1,3-dicyclohexyl-2-(p-trifluoromethylbenzyl)-2-thiopseudouronium chloride
1,3-dicyclohexyl-2-(p-trifluoromethoxybenzyl)-2-thiopseudouronium chloride
1,3-dicyclohexyl-2-(p-trifluoroacetylbenzyl)-2-thiopseudouronium chloride
1,3-dicyclohexyl-2-(p-trifluoromethylsulfonylbenzyl)-2-thiopseudouronium chloride
1,3-dicyclohexyl-2-(p-dimethylaminobenzyl)-2-thiopseudouronium chloride
1,3-dicyclohexyl-2-(p-cyanobenzyl)-2-thiopseudouronium chloride
1,3-dicyclohexyl-2-(p-methoxybenzyl)-2-thiopseudouronium chloride
1,3-dicyclohexyl-2-[p-(4-chlorophenoxy)benzyl]-2-thiopseudouronium chloride
1,3-dicyclohexyl-2-[p-(4-chlorophenyl)benzyl]-2-thiopseudouronium chloride
1,3-dicyclohexyl-2-(p-thiacyanatobenzyl)-2-thiopseudouronium chloride
1,3-dicyclohexyl-2-(p-methylthiobenzyl)-2-thiopseudouronium chloride
1,3-dicyclohexyl-2-(p-dimethylsulfonamidobenzyl)-2-thiopseudouronium chloride
1,3-dicyclohexyl-2-(o-bromobenzyl)-2-thiopseudouronium chloride
1,3-dicyclohexyl-2-(m-bromobenzyl)-2-thiopseudouronium chloride
1,3-dicyclohexyl-2-(p-bromobenzyl)-2-thiopseudouronium bromide
1,3-dicyclohexyl-2-(o-fluorobenzyl)-2-thiopseudouronium chloride
1,3-dicyclohexyl-2-(m-fluorobenzyl)-2-thiopseudouronium chloride
1,3-dicyclohexyl-2-(p-fluorobenzyl)-2-thiopseudouronium chloride
1,3-dicyclohexyl-2-(o-iodobenzyl)-2-thiopseudouronium chloride
1,3-dicyclohexyl-2-(2,5-dinitrobenzyl)-2-thiopseudouronium chloride
1,3-dicyclohexyl-2-(2,4-difluorobenzyl)-2-thiopseudouronium chloride
1,3-dicyclohexyl-2-(2,4-dibromobenzyl)-2-thiopseudouronium bromide
1,3-dicyclohexyl-2-(2,6-dibromobenzyl)-2-thiopseudouronium bromide
1,3-dicyclohexyl-2-(2,6-difluorobenzyl)-2-thiopseudouronium chloride
1,3-dicyclohexyl-2-(3,5-dibromobenzyl)-2-thiopseudouronium bromide
1,3-dicyclohexyl-2-(3,5-difluorobenzyl)-2-thiopseudouronium chloride
1,3-dicyclohexyl-2-(3-trifluoromethyl-4-cyanobenzyl)-2-thiopseudouronium chloride
1,3-dicyclohexyl-2-(3-trifluoromethyl-4-chlorobenzyl)-2-thiopseudouronium chloride
1,3-dicyclohexyl-2-(3-trifluoromethyl-4-fluorobenzyl)-2-thiopseudouronium chloride
1,3-dicyclohexyl-2-(3-trifluoromethyl-4-bromobenzyl)-2-thiopseudouronium bromide
1,3-dicyclohexyl-2-(3-trifluoromethyl-4-nitrobenzyl)-2-thiopseudouronium chloride
1,3-dicyclohexyl-2-(2-chloro-4-trifluoromethylbenzyl)-2-thiopseudouronium chloride
1,3-dicyclohexyl-2-(2-bromo-4-trifluoromethylbenzyl)-2-thiopseudouronium bromide
1,3-dicyclohexyl-2-(2-fluoro-4-trifluoromethylbenzyl)-2-thiopseudouronium chloride
1,3-dicyclohexyl-2-(2-nitro-4-trifluoromethylbenzyl)-2-thiopseudouronium chloride
1,3-dicyclohexyl-2-(3-chloro-4-trifluoromethylbenzyl)-2-thiopseudouronium chloride
1,3-dicyclohexyl-2-(3-bromo-4-trifluoromethylbenzyl)-2-thiopseudouronium chloride
1,3-dicyclohexyl-2-(3-fluoro-4-trifluoromethylbenzyl)-2-thiopseudouronium chloride
1,3-dicyclohexyl-2-(2-trifluoromethyl-4-cyanobenzyl)-2-thiopseudouronium chloride
1,3-dicyclohexyl-2-(2-trifluoromethyl-4-chlorobenzyl)-2-thiopseudouronium chloride
1,3-dicyclohexyl-2-(2-trifluoromethyl-4-fluorobenzyl)-2-thiopseudouronium chloride
1,3-dicyclohexyl-2-(2-trifluoromethyl-4-bromobenzyl)-2-thiopseudouronium bromide
1,3-dicyclohexyl-2-(2-trifluoromethyl-4-nitrobenzyl)-2-thiopseudouronium chloride
1,3-dicyclohexyl-2-(2-chloro-4-nitrobenzyl)-2-thiopseudouronium chloride
1,3-dicyclohexyl-2-(2-bromo-4-nitrobenzyl)-2-thiopseudouronium bromide
1,3-dicyclohexyl-2-(2-fluoro-4-nitrobenzyl)-2-thiopseudouronium chloride
1,3-dicyclohexyl-2-(3-cyano-4-nitrobenzyl)-2-thiopseudouronium chloride
1,3-dicyclohexyl-2-(3-chloro-4-nitrobenzyl)-2-thiopseudouronium chloride 1,3-dicyclohexyl-2-(3-bromo-4-nitrobenzyl)-2-thiopseudouronium chloride
1,3-dicyclohexyl-2-(3-fluoro-4-nitrobenzyl)-2-thiopseudouronium chloride
1,3-dicyclohexyl-2-(3-trifluoromethyl-4-nitrobenzyl)-2-thiopseudouronium chloride
1,3-dicyclohexyl-2-(3-nitro-4-bromobenzyl)-2-thiopseudouronium bromide

EXAMPLE 11

When the benzyl halides of Example 7 are reacted with the thioureas from Examples 1–6, then the corresponding product is prepared. A representative list of the compounds prepared is shown in Table 1 below.

Table 1

1,3-dimethyl-2-(o-chlorobenzyl)-2-thiopseudouronium chloride
1,3-dimethyl-2-(m-chlorobenzyl)-2-thiopseudouronium chloride
1,3-dimethyl-2-(p-chlorobenzyl)-2-thiopseudouronium chloride
1-i-propyl-2-(2,3-dichlorobenzyl)-2-thiopseudouronium chloride
1-hexyl-2-(2,4-dichlorobenzyl)-2-thiopseudouronium chloride
1-methallyl-2-(2,5-dichlorobenzyl)-2-thiopseudouronium chloride
1,3-dicyclohexyl-2-(3,4-dichlorobenzyl)-2-thiopseudouronium chloride
1,3-dimethallyl-2-(3,5-dichlorobenzyl)-2-thiopseudouronium chloride
1-cyclopropyl-2-(2,3,4-dichlorobenzyl)-2-thiopseudouronium chloride
1,3-dihexyl-2-(2,3,5-dichlorobenzyl)-2-thiopseudouronium chloride
1-methyl-2-(2,3,6-dichlorobenzyl)-2-thiopseudouronium chloride
1-cyclopentyl-2-(2,4,5-dichlorobenzyl)-2-thiopseudouronium chloride
1-(2-cyclohexenyl)-2-(2,4,6-dichlorobenzyl)-2-thiopseudouronium chloride
1-propargyl-2-(3,4,5-dichlorobenzyl)-2-thiopseudouronium chloride
1,3-dihexyl-2-(p-trifluoromethylbenzyl)-2-thiopseudouronium chloride
1,3-dimethallyl-2-(p-trifluoromethoxybenzyl)-2-thiopseudouronium chloride
1,1-dicyclohexyl-2-(p-trifluoroacetylbenzyl)-2-thiopseudouronium chloride
1,1-pentamethylene-2-(p-trifluoromethylsulfonylbenzyl)-2-thiopseudouronium chloride
1,3-diethyl-1-cyclohexyl-2-(p-dimethylaminobenzyl)-2-thiopseudouronium chloride
1,1,3-trimethyl-2-(p-cyanobenzyl)-2-thiopseudouronium chloride
1,1-dimethyl-3-cyclohexyl-2-(p-methoxybenzyl)-2-thiopseudouronium chloride
1,1-dicyclopropyl-2-[p-(4-chlorophenoxy)benzyl]-2-thiopseudouronium chloride
1-cyclobutyl-2-[p-(4-chlorophenyl)benzyl]-2-thiopseudouronium chloride
1,3-diethyl-2-(p-thiacyanatobenzyl)-2-thiopseudouronium chloride
1,3-dihexyl-2-(p-methylthiobenzyl)-2-thiopseudouronium chloride
1,3-diallyl-2-(p-dimethylsulfonamidobenzyl)-2-thiopseudouronium chloride
1-ethyl-2-(o-bromobenzyl)-2-thiopseudouronium chloride
1-cyclopropyl-2-(m-bromobenzyl)-2-thiopseudouronium chloride
1-ethyl-2-(p-bromobenzyl)-2-thiopseudouronium bromide
1,1-dihexyl-2-(o-fluorobenzyl)-2-thiopseudouronium chloride
1-ethyl-2-(m-fluorobenzyl)-2-thiopseudouronium chloride
1-n-propyl-2-(p-fluorobenzyl)-2-thiopseudouronium chloride
1-methyl-2-(o-iodobenzyl)-2-thiopseudouronium chloride
1-(4-pentenyl)-2-(2,5-dinitrobenzyl)-2-thiopseudouronium chloride
1,3-dimethyl-2-(2,4-difluorobenzyl)-2-thiopseudouronium chloride
1-cyclohexyl-1-methyl-2-(2,4-dibromobenzyl)-2-thiopseudouronium bromide
1,3-dimethyl-2-(2,6-dibromobenzyl)-2-thiopseudouronium bromide
1-methyl-2-(2,6-difluorobenzyl)-2-thiopseudouronium chloride
1-methyl-2-(3,5-dibromobenzyl)-2-thiopseudouronium bromide
1-i-propyl-2-(3,5-difluorobenzyl)-2-thiopseudouronium chloride
1,3-dimethyl-2-(3,-trifluoromethyl-4-cyanobenzyl)-2-thiopseudouronium chloride
1,3-dimethyl-2-(3-trifluoromethyl-4-chlorobenzyl)-2-thiopseudouronium chloride
1,3-dimethyl-2-(3-trifluoromethyl-4-fluorobenzyl)-2-thiopseudouronium chloride
1,3-dimethyl-2-(3-trifluoromethyl-4-bromobenzyl)-2-thiopseudouronium bromide
1,3-dimethyl-2-(3-trifluoromethyl-4-nitrobenzyl)-2-thiopseudouronium chloride
1,3-dimethyl-2-(2-chloro-4-trifluoromethylbenzyl)-2-thiopseudouronium chloride
1,3-dimethyl-2-(2-bromo-4-trifluoromethylbenzyl)-2-thiopseudouronium bromide
1,3-dimethyl-2-(2-fluoro-4-trifluoromethylbenzyl)-2-thiopseudouronium chloride
1,3-dipropyl-1-cyclohexyl-2-(2-nitro-4-trifluoromethylbenzyl)-2-thiopseudouronium chloride
1-butyl-2-(3-chloro-4-trifluoromethylbenzyl)-2-thiopseudouronium chloride
1-(3,5,5-trimethylheptyl)-2-(3-bromo-4-trifluoromethylbenzyl)-2-thiopseudouronium chloride
1-(2-cyclooctenyl)-2-(3-fluoro-4-trifluoromethylbenzyl)-2-thiopseudouronium chloride
1,1,3-trimethyl-2-(2-trifluoromethyl-4-cyanobenzyl)-2-thiopseudouronium chloride
1,3-diallyl-2-(2-trifluoromethyl-4-chlorobenzyl)-2-thiopseudouronium chloride
1,3-dimethyl-2-(2-trifluoromethyl-4-fluorobenzyl)-2-thiopseudouronium chloride
1,3-diisopropyl-2-(2-trifluoromethyl-4-bromobenzyl)-2-thiopseudouronium bromide
1,3-dicyclohexyl-1-methyl-2-(2-trifluoromethyl-4-nitrobenzyl)-2-thiopseudouronium chloride
1,1-dicyclopropylmethyl-2-(2-chloro-4-nitrobenzyl)-2-thiopseudouronium chloride 1,3-dibutyl-2-(2-bromo-4-nitrobenzyl)-2-thiopseudouronium bromide
1,1,3-tricyclohexyl-2-(2-fluoro-4-nitrobenzyl)-2-thiopseudouronium chloride
1,3-diethyl-2-(3-cyano-4-nitrobenzyl)-2-thiopseudouronium chloride
1-allyl-2-(3-chloro-4-nitrobenzyl)-2-thiopseudouronium chloride
1-butyl-2-(3-bromo-4-nitrobenzyl)-2-thiopseudouronium chloride
1,1-dicylopropylmethyl-2-(3-fluoro-4-nitrobenzyl)-2-thiopseudouronium chloride
1,3-dicyclohexyl-1-hexyl-2-(3-trifluoromethyl-4-nitrobenzyl)-2-thiopseudouronium chloride
1,1,3-trimethyl-2-(3-nitro-4-bromobenzyl)-2-thiopseudouronium bromide

EXAMPLE 12

1,3-Dicyclohexyl-2-(2,6-dichlorobenzyl)-2-thiopseudouronium bromide

Twenty-five g. of 1,3-dicyclohexyl-2-(2,6-dichlorobenzyl-2-thiopseudouronium chloride is added to 200 ml of a saturated aqueous sodium bromide solution. The mixture is warmed to 50°C and digested for 5 min., cooled in an ice-bath and the water decanted. Another 200 ml of saturated sodium bromide solution is added and the procedure repeated. The ion exchanged thiopseudouronium is filtered and washed with 3-50 ml portions of ice cold water. The solid is then dried to obtain 1,3-dicyclohexyl-2-(2,6-dichlorobenzyl)-2-thiopseudouronium bromide.

When the sodium bromide solution in the above example is replaced with a solution of sodium iodide then the resultant compound is 1,3-dicyclohexyl-2-(2,6-dichlorobenzyl)-2-thiopseudouronium iodide.

In a similar manner the chloride ion may be exchanged with an ion of greater nucleophilic character.

I claim:

1. A method for the treatment of gastrointestinal hyperacidity and ulceration in humans and mammals which comprises the oral or parenteral administration thereto of between about 0.1–50 mg/kg per day of at least one compound selected from the group consisting of:
1,3-dicylohexyl-2-(o-chlorobenzyl)-2-thiopseudouronium chloride,
1,3-dicyclohexyl-2-(m-chlorobenzyl)-2-thiopseudouronium chloride,
1,3-dicyclohexyl-2-(p-chlorobenzyl)-2-thiopseudouronium chloride,
1,3-dicyclohexyl-2-(2,3-dichlorobenzyl)-2-thiopsuedouronium chloride,
1,3-dicyclohexyl-2-(2,4-chlorobenzyl)-2-thiopseudouronium chloride,
1,3-dicyclohexyl-2-(2,5-dichlorobenzyl)-2-thiopseudouronium chloride,
1,3-dicyclohexyl-2-(3,4-dichlorobenzyl)-2-thiopseudouronium chloride,
1,3-dicyclohexyl-2-(3,5-dichlorobenzyl)-2-thiopseudouronium chloride,
1,3-dicyclohexyl-2-(2,3,4-dichlorobenzyl)-2-thiopsuedouronium chloride,
1,3-dicyclohexyl-2-(2,3,5-dichlorobenzyl)-2-thiopseudouronium chloride,
1,3-dicyclohexyl-2-(2,3,6-dichlorobenzyl)-2-thiopseudouronium chloride,
1,3-dicyclohexyl-2-(2,4,5-dichlorobenzyl)-2-thiopsuedouronium chloride,
1,3-dicyclohexyl-2-(2,4,6-dichlorobenzyl)-2-thiopseudouronium chloride and
1,3-dicyclohexyl-2-(3,4,5-dichlorobenzyl)-2-thiopsuedouronium chloride 2. The method for the treatment of gastrointestinal hyperacidity and ulceration in humans and mammals which comprises the oral or parenteral administration thereto of between about 0.1 and 50 mg/kg per day of 1,3-dicyclohexyl-2-(2,6-dichlorobenzyl)-2-thiopseudouronium chloride.

* * * * *